United States Patent Office.

FRANCIS H. WRIGHT, OF RICHMOND, INDIANA, ASSIGNOR TO HIMSELF, WILLIAM C. SLADE, AND B. M. PRATT, OF SAME PLACE.

Letters Patent No. 65,323, dated May 28, 1867.

IMPROVEMENT IN TANNING.

*The Schedule referred to in these Letters Patent and making part of the same.*

TO ALL WHOM IT MAY CONCERN:

Be it known that I, FRANCIS H. WRIGHT, of the city of Richmond, in the county of Wayne, and State of Indiana, have invented a new and improved Process of Tanning Leather, Furs, and Skins; and I do hereby declare that the following is a full and exact description of the process and material used, reference being had to the accompanying formulæ and samples, and to the letters of reference marked thereon.

The nature of my invention consists, first, in the use of the proportion of ingredients as named in the accompanying formulæ, letters A and B; second, the manner of treatment described as follows:

Formula A.

(10) ten pounds catechu; ($\frac{1}{2}$) one-half ounce saltpetre; (2) two pounds Glauber salts; ($1\frac{1}{2}$) one and a half pound Spanish whiting; (1) one pound sulphuric acid; (1) one pound salt.

Formula B.

($1\frac{1}{2}$) one and a half ounce saltpetre; (1) one pound alum; ($\frac{1}{2}$) one-half pound salt; (6) six ounces sulphuric acid.

When hides and skins have been unhaired, fleshed, and bated by the usual process, have dissolved in ($1\frac{1}{2}$) one and a half gallon hot water the first four ingredients in formula A, and add when cold the sulphuric acid. Then to water sufficient to cover the hides add of this solution or tan liquor sufficient to color the water brown, then immerse skins, and handle or stir them for (10) ten minutes, then remove and add as much more tan liquor, then handle again for (15) fifteen to (20) twenty minutes. Remove skins second time and strengthen and handle, as before, and as soon as the grain begins to feel rough and is of light brown color, remove the skins the third time, and in the balance of the prepared tan liquor dissolve the last-named article (salt) in formula A, and of this add one-half, and immerse hides and skins and handle (30) thirty to (50) fifty minutes. Then remove fourth time and add balance of the tan preparation, and handle (3) three or (4) four times daily until tanned, which will require from a few hours to (4) four to (6) six days according to kind of skins. The above is sufficient for (5) five or (6) six calf or sheep-skins. For heavy hides strengthen daily until tanned.

Second. In tanning furs and skins the materials named in and in the proportion of formula B, are used in the following manner: Dissolve the first three ingredients in one quart warm water, and when cold add the sulphuric acid. To water sufficient to cover (6) six small hides add one-half of the solution, immerse the skins, and add the remainder of the solution, and handle occasionally until tanned, when they are rinsed and hung up to dry.

What I claim as my invention, is—

The use of the proportion of ingredients named in formulæ A and B, and the manner of applying the same to hides, furs, and skins for the purpose of tanning the same rapidly and effectually.

FRANCIS H. WRIGHT.

Witnesses:
FRANK M. SLADE,
JOHN H. POPP.